United States Patent [19]

Mehmke

[11] Patent Number: 5,161,238
[45] Date of Patent: Nov. 3, 1992

[54] APPARATUS FOR CONFINING LASER BEAMS

[75] Inventor: Bernd Mehmke, Bad Sachsa, Fed. Rep. of Germany

[73] Assignee: Lambda Physik Forschungs-und Entwicklungs-Gesellschaft GmbH, Fed. Rep. of Germany

[21] Appl. No.: 331,246

[22] Filed: Mar. 31, 1989

[30] Foreign Application Priority Data

May 27, 1988 [DE] Fed. Rep. of Germany ....... 3818129

[51] Int. Cl.$^5$ ............................................. H01S 3/043
[52] U.S. Cl. .................................... 359/738; 359/739; 372/34; 372/103
[58] Field of Search ............... 350/449, 448, 171, 172, 350/319; 359/738, 739; 372/34, 103

[56] References Cited

U.S. PATENT DOCUMENTS 3,578,849  5/1971  Guillet ................................. 350/448
4,940,308  7/1990  Debesis ............................... 350/319

Primary Examiner—Scott J. Sugarman
Attorney, Agent, or Firm—Kirschstein, Ottinger, Israel & Schiffmiller

[57] ABSTRACT

An apparatus for confining or limiting laser beams of medium and high power comprises a diaphragm 1, 1' which is mirrored and is arranged with respect to the laser beam 2 in such a manner that the beam portions (3, 3') reflected by the diaphragm are directed away from the laser beam axis A.

5 Claims, 1 Drawing Sheet

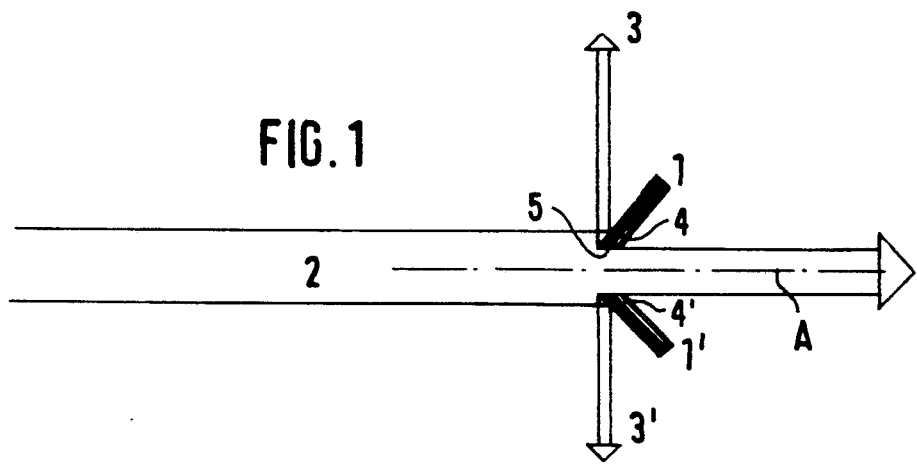
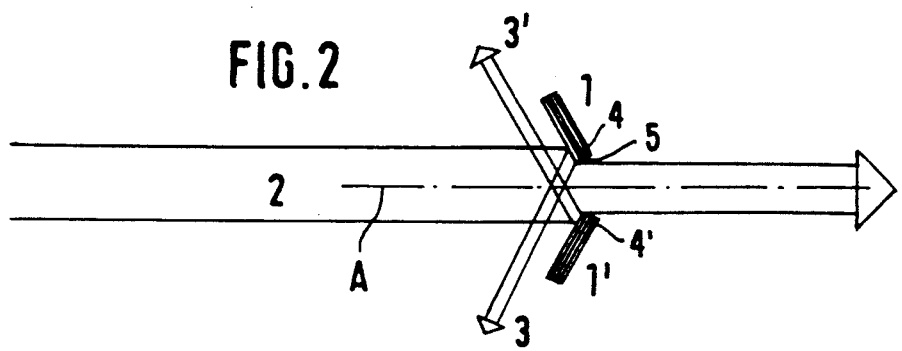
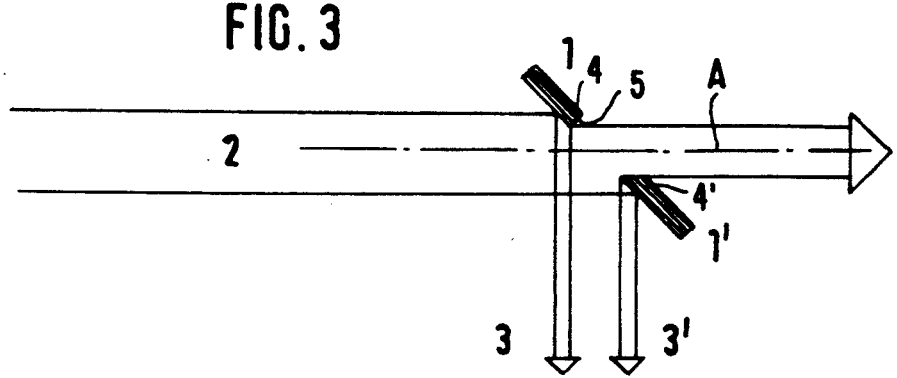

APPARATUS FOR CONFINING LASER BEAMS

BACKGROUND OF THE INVENTION

1. Field of the Invention

The invention relates to an apparatus for confining laser beams of medium and high power with a diaphragm confining the laser beam.

2. Description of Related Art

For a great variety of reasons it is frequently necessary to geometrically confine or restrict laser beams. For example, it may be necessary to adapt the dimensions of the laser beam to a given optical system, generate a beam with a specifically configured cross-section, produce sharp beam boundaries or reduce the beam opening angle.

In the prior art for confining the laser beam diaphragms are usually employed which absorb the unrequired parts of the laser beam. The diaphragms may have various forms depending on the desired dimensions of the confined or limited laser beam. Usually, circular pinhole or rectangular slit diaphragms are employed, depending on whether the dimension of the laser beam is to be limited in one or two dimensions. Diaphragms may be arranged in the laser beam outside the laser (extracavity) or in the laser resonator (intracavity).

The known diaphragm arrangements involve however problems when the power of the laser lies in the medium or higher range, i.e. is a few Watts or more. Since the known diaphragms limit the beam by absorption of beam components the diaphragms can become very hot and assume temperatures of more than 100° C. This heating of the diaphragms leads to a heating of the surrounding air and as a result schliere formation can occur at the edges. The density of the air changes directly at the edges of the diaphragm so that inhomogeneity of the refractive index occurs in said region and this causes the schliere formation.

Such schliere formation or streaks disturb the rectilinear propagation of the laser beam. The schliere formation impairs the quality of the laser beam and under unfavourable conditions may even partially cancel the effect of one or more diaphragms which are intended to sharply restrict the beam or confine the beam opening angle. Due to the schliere formation the edge parts of the laser beam are irregularly diffracted so that the sharp edge boundaries become blurred again and parts of the beam can be reflected into precisely those directions which the diaphragms are intended to block off.

SUMMARY OF THE INVENTION

The invention is based on the problem of providing an apparatus for confining laser beams of medium and high power which with simple means ensures a sharp beam boundary without interferences.

According to the invention this problem is solved in that the laser beam is confined by a diaphragm which is at least partially measured and is arranged with respect to the laser beam in such a manner that the beam portions reflected by the diaphragm are directed away from the laser beam axis. The term "directed away from" is to be taken as meaning that the reflected beam portions are removed from the laser beam. In being so they can previously intersect the beam axis.

Due to the mirroring of the diaphragm provided according to the invention a negligibly small heating up thereof or none at all takes place. The energy of the shut-out beam portions is substantially reflected, i.e. carried away from the diaphragm. The diaphragm is mirrored to such an extent that at the wavelength of the laser beam it is not absorbent or is only negligibly absorbent, i.e. absorbs only a few percent.

Since due to the good direction characteristic of the laser, the beam portions reflected by the diaphragm are likewise relatively sharply aligned, they can be reflected completely out of the laser beam and directed onto an absorber which is arranged at an adequate distance from the laser beam to ensure that any possible heating of the absorber cannot cause any disturbances of the laser beam.

Thus, according to the invention the mirrored diaphragms are arranged with respect to the laser beam axis in such a manner that the mirror surfaces form an angle other than 90° with the beam axis.

Hereinafter examples of the invention will be described with the aid of the drawings.

BRIEF DESCRIPTION OF THE DRAWINGS

FIGS. 1 to 3 show various embodiments of apparatuses for confining laser beams of medium and high power.

DETAILED DESCRIPTION OF THE PREFERRED EMBODIMENTS

According to FIG. 1 a diaphragm 1, 1' is arranged in the optical path of the laser beam 2 having an optical beam axis A. The Figure shows a horizontal section through the diaphragm which has wall portions 4, 4 bounding an opening 5 that for example may be slit-shaped or circular. With a circular diaphragm FIG. 1 would also represent a vertical section.

The beam portions 3, 3' of the laser beam 2 are blocked and reflected the wall portions 4, 4' of the diaphragm 1, 1' and are directed away from the laser beam axis in two rays extending in opposite directions generally normal to the beam axis and remote from the laser beam 2 to be intercepted by a suitable absorber (not shown).

The diaphragm 1, 1' is mirrored at least at the blocking wall portions 4, 4 upon which the incident laser beam 2 impinges. The diaphragm may be polished metal, specially coated glass or other type of mirror, each serving as a light reflector.

FIGS. 2 and 3 show modifications of the embodiment according to FIG. 1 and will be immediately understood. The variant according to FIG. 3 has the advantage that the reflected beam portions 3, 3' are directed in the same direction generally normal to the beam axis so that they can be intercepted by a single absorber. In the variant according to FIG. 2, it is possible to configure the mirror surfaces of the blocking wall portions 4, 4 in such a manner that the reflected beam portions 3, 3' can be directed along intersecting paths and selectively onto a specific target. Also, the reflected beams portions 3, 3' may themselves be used as auxiliary beam.

I claim:

1. A heat-resistant diaphragm for confining a medium/high power laser beam having an optical axis and directed along an optical path, comprising:
   wall portions in the optical path and bounding an opening through which a part of the laser beam passes, at least one of the wall portions blocking another part of the laser beam impinging on said at least one blocking wall portion from passing through the opening; and a light reflector on said at least one blocking wall portion for reflecting the other part of the laser beam impinging directly on said at least one blocking wall portion away from the light reflector and in a direction inclined relative to the optical axis, thereby resisting heat build-up at said at least one blocking wall portion due to direct exposure to the medium/high power laser beam.

2. The diaphragm according to claim 1, wherein there are two wall portions blocking the other part of the laser beam, said two wall portions being spaced apart of each other at opposite sides of the optical axis; and wherein there are two light reflectors, one for each blocking wall portion.

3. The diaphragm according to claim 2, wherein the two wall portions and light reflectors are positioned to reflect the other part of the laser beam in two rays extending in opposite directions generally normal to the optical axis.

4. The diaphragm according to claim 2, wherein the two wall portions and light reflectors are positioned to reflect the other part of the laser beam in two rays extending in the same direction generally normal to the optical axis.

5. The diaphragm according to claim 2, wherein the two wall portions and light reflectors are positioned to reflect the other part of the laser beam in two rays extending in intersecting relationship with each other.

* * * * *